US012795742B2

(12) United States Patent
Futaki et al.

(10) Patent No.: US 12,795,742 B2
(45) Date of Patent: Nov. 10, 2026

(54) RADIO TERMINAL AND METHOD THEREFOR

(71) Applicant: NEC Corporation, Tokyo (JP)

(72) Inventors: Hisashi Futaki, Tokyo (JP); Sadatuku Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 196 days.

(21) Appl. No.: 18/695,088

(22) PCT Filed: Sep. 28, 2022

(86) PCT No.: PCT/JP2022/036174

§ 371 (c)(1),
(2) Date: Mar. 25, 2024

(87) PCT Pub. No.: WO2023/068000

PCT Pub. Date: Apr. 27, 2023

(65) Prior Publication Data

US 2025/0168888 A1 May 22, 2025

(30) Foreign Application Priority Data

Oct. 20, 2021 (JP) ................................ 2021-171922

(51) Int. Cl.
*H04W 74/0833* (2024.01)
*H04W 48/16* (2009.01)

(52) U.S. Cl.
CPC ....... *H04W 74/0833* (2013.01); *H04W 48/16* (2013.01)

(58) Field of Classification Search
CPC .......................... H04W 74/0833; H04W 48/16
See application file for complete search history.

(56) References Cited

U.S. PATENT DOCUMENTS 11,963,234 B2 * 4/2024 He ...................... H04W 74/002
2014/0241285 A1 8/2014 Pang et al.
2020/0396654 A1 12/2020 Freda et al.
2021/0282191 A1 * 9/2021 Chang ................... H04W 16/18
(Continued)

FOREIGN PATENT DOCUMENTS

JP 2021-503226 A 2/2021
WO 2019/018831 A1 1/2019
(Continued)

OTHER PUBLICATIONS

International Search Report for PCT Application No. PCT/JP2022/036174, mailed on Dec. 27, 2022.
(Continued)

*Primary Examiner* — Ajay Cattungal
(74) *Attorney, Agent, or Firm* — Paratus Law Group, PLLC

(57) ABSTRACT

A radio terminal (1) performs a first random access using a random access resource associated with a feature combination. If the first random access fails, the radio terminal (1) falls back to a second random access using a random access resource associated with a feature subset included in the feature combination. This helps, for example, to provide a fallback in the event of a failed random access procedure using a random access resource associated with a feature combination.

21 Claims, 10 Drawing Sheets

(56) References Cited

U.S. PATENT DOCUMENTS

| | | | | |
|---|---|---|---|---|
| 2023/0106194 | A1* | 4/2023 | Rudolf | H04L 5/14 370/329 |
| 2023/0108510 | A1* | 4/2023 | Wang | H04L 5/0044 370/329 |
| 2023/0217423 | A1 | 7/2023 | Zhu et al. | |
| 2023/0217485 | A1 | 7/2023 | Jeong et al. | |
| 2024/0179684 | A1* | 5/2024 | Mo | H04W 72/02 |
| 2025/0008563 | A1* | 1/2025 | Bergström | H04W 74/0833 |
| 2025/0047434 | A1* | 2/2025 | Yamamoto | H04W 72/04 |

FOREIGN PATENT DOCUMENTS

| | | | |
|---|---|---|---|
| WO | 2020/074636 | A1 | 4/2020 |
| WO | 2021/206487 | | 10/2021 |
| WO | 2023/012705 | A1 | 2/2023 |

OTHER PUBLICATIONS

ZTE Corporation, "RRC and MAC related aspects of common RACH configuration", R2-2107484, 3GPP TSG-RAN WG2 #115e Electronic meeting, Aug. 16-27, 2021.

NEC, "General aspects of RACH indication and partitioning", R2-2108138, 3GPP TSG-RAN WG2 #115e Electronic meeting, Aug. 16-27, 2021.

Ericsson, "RACH partitioning for Rel-17 features", R2-2108253, 3GPP TSG-RAN WG2 #115e Electronic meeting, Aug. 16-27, 2021.

InterDigital, "Report for Rel-17 Small data and URLLC/IIoT", R2-2108834, 3GPP TSG-RAN WG2 #115e Electronic meeting, Aug. 16-27, 2021.

VIVO, "Discussion on RACH Partitioning in Rel-17", 3GPP TSG RAN WG2 #115-e R2-2107058, Aug. 6, 2021.

Intel Corporation, "Report of email discussion [Post114-e][507][SData] Non-SDT data arrival handling", 3GPP Tsg Ran WG2 #115-e R2-2107292, Aug. 9, 2021.

Xiaomi Communications, "RACH failure in subsequent data transmission phase", 3GPP TSG RAN WG2 #115-e R2-2108791, Aug. 9, 2021.

Extended European Search Report for EP Application No. 22883308.3, dated on Dec. 19, 2024.

Samsung: "SON Enhancements for 2SRA", 3GPP Draft; 3GPP TSG-RAN WG2 Meeting #115 electronic R2-2108642, Aug. 6, 2021.

ZTE Corporation: "Discussion on support of Type A PUSCH repetitions for Msg3", 3GPP Draft; 3GPP TSG RAN WG1 #106bis-e R1-2108849, Sep. 30, 2021.

JP Office Action for JP Application No. 2023-555089, mailed on May 20, 2025 with English Translation.

Indian Official Communication for IN Application No. 202417031431, mailed on May 11, 2026.

* cited by examiner

Fig. 8

NR PRACH Configuration List

| IE / Groupe Name | Presence | Range | IE Type and reference | Semantics description |
|---|---|---|---|---|
| NR PRACH Configuration Item | | | | |
| >NR SCS | M | | | |
| >PRACH Frequency Start from Carrier | M | | | |
| >MSG1-FDM | M | | | |
| >PRACH Configuration Index | M | | | |
| >SSB per RACH Occasion | M | | | |
| ~~~ | | | | |
| >Feature Set Combination (Option 1) | O | | ENUMERATED (true, ...) | |
| >Feature Set Combination (Option 2) | O | | BITSTRING (SIZE(32)) | Each position in the bitmap indicates a feature set combination, as defined in TS 3x.abc (e.g. 37.320).<br>First Bit = RedCap+SDT,<br>Second Bit= RedCap+Slicing<br>Third Bit = RedCap +CovEnh<br>Fourth Bit = SDT+Slicing<br>Fifth Bit = SDT+CovEnh<br>Sixth Bit = Slicing+CovEnh<br>Seventh Bit = RedCap+SDT+Slicing<br>Eighth Bit = RedCap+SDT+CovEnh<br>and so on..<br><br>Value "1" indicates "supported (or available)" and value "0" indicates "not supported (or available)". |

RADIO TERMINAL AND METHOD THEREFOR

This application is a National Stage Entry of PCT/JP2022/036174 filed on Sep. 28, 2022, which claims priority from Japanese Patent Application 2021-171922 filed on Oct. 20, 2021, the contents of all of which are incorporated herein by reference, in their entirety.

TECHNICAL FIELD

The present disclosure relates to radio communication networks, and in particular to random access.

BACKGROUND ART

The 3rd Generation Partnership Project (3GPP (registered trademark)) Radio Access Network (RAN) Working Group is currently considering support for additional random access resource partitioning. This functionality will be introduced in 3GPP Release 17 (see, for example, Non-Patent Literature 1-4). Random Access Resource Partitioning partitions the random access resources used for random access preamble transmission. Random Access Resource Partitioning allows a radio terminal (e.g., User Equipment (UE)) to provide information to a radio access network node (e.g., gNB, eNB) by means of the resources used in the random access preamble transmission.

In this specification, random access resources refer to random access preambles, or combinations of random access occasions and random access preambles. Random access resource partitioning is also referred to as Random Access Channel (RACH) resource partitioning or RACH partitioning. Random access occasions are also referred to as RACH occasions (ROs) and random access preambles are also referred to as RACH preambles. A RACH occasion is the time and frequency resources for a RACH preamble transmission. According to the current 3GPP Release 15 and Release 16 specifications, there are 64 RACH preambles in a RACH occasion that can be used for transmission.

With 3GPP Release 16 RACH partitioning, the UE can inform the gNB of the following information, depending on which RACH preamble is used:

- Selected Synchronization Signal (SS)/Physical Broadcast Channel (PBCH) block (SSB) (or selected beam);
- Contention-Free Random Access (CFRA) or Contention-Based RA (CBRA) cause;
- Payload size (preamble group B configured or not);
- Random access type (2-step or 4-step RA).

Additional RACH partitioning is being considered for some Release 17 features to allow the network to identify the features early. These features include, for example, Reduced Capability (RedCap), Small Data Transmission (SDT), Coverage Enhancement (CE or CovEnh), and Slicing. All of the RACH resource partitions that result from possible feature combinations or combinations of features need to be configured. For example, possible feature combinations include RedCap+SDT, RedCap+CovEnh, RedCap+Slicing, RedCap+SDT+CovEnh, RedCap+SDT+Slicing, RedCap+CovEnh+Slicing, and so on. A feature can be called a functional feature.

The RedCap indication in RACH is used to indicate reduced capabilities to the network in the first RACH message (MSG1 in 4-step RA, MSGA in 2-step RA), allowing the network to adapt subsequent transmissions.

The SDT indication in RACH is used to indicate SDT to the network and to request a larger third RACH message (MSG3) size. Alternatively, the SDT indication is used to indicate a larger MSGA size (i.e., the size of the data portion of the MSGA) in the case of a 2-step RA.

The CovEnh indication in RACH is used to indicate the need for coverage enhancement, for example, to request a repetition of the third RACH message (MSG3 in 4-step RA). The CovEnh indication can be binary information to indicate whether a Msg3 PUSCH repetition is required or not.

The slicing indication in RACH is used to indicate a higher-priority slice to the network and to achieve slice isolation even for RACH. The slicing indication can be binary information to distinguish between prioritized and non-prioritized network slices. Alternatively, the slicing indication may indicate a multi-level slice priority, a selected or intended network slice, or a selected or intended network slice group, which would further increase the number of partitions.

CITATION LIST

Non Patent Literature

[Non-Patent Literature 1] ZTE Corporation, "RRC and MAC related aspects of common RACH configuration", R2-2107484, 3GPP TSG-RAN WG2 #115e, Electronic meeting, Aug. 16-27, 2021

[Non-Patent Literature 2] NEC, "General aspects of RACH indication and partitioning", R2-2108138, 3GPP TSG-RAN WG2 #115e, Electronic meeting, Aug. 16-27, 2021

[Non-Patent Literature 3] Ericsson, "RACH partitioning for Rel-17 features", R2-2108253, 3GPP TSG-RAN WG2 #115e, Electronic meeting, Aug. 16-27, 2021

[Non-Patent Literature 4] InterDigital, "Report for Rel-17 Small data and URLLC/IIOT", R2-2108834, 3GPP TSG-RAN WG2 #115e, Electronic meeting, Aug. 16-27, 2021

SUMMARY OF INVENTION

Technical Problem

The inventor has studied the random access resource partitioning for Release 17 features and feature combinations and found various problems.

One of these problems concerns fallback operations when a random access procedure fails. For example, it is unclear how the UE should behave when it has performed a random access using a resource selected from a set of random access resources associated with a Release 17 feature combination, but that random access fails. Furthermore, if a Contention-Free Random Access (CFRA) initiated by the UE fails, the UE may fall back to Contention-Based RA (CBRA). In this case, it is unclear how the UE selects a random access resource for the CBRA.

Another one of these problems concerns the behavior of a UE after initiating a random access procedure intended for Small Data Transmission (SDT). When the UE is in Radio Resource Control (RRC)_INACTIVE, SDT is allowed only to a specific Data Radio Bearer (DRB) (hereafter referred to as SDT DRB). For uplink data transmission for another DRB (hereafter referred to as non-SDT DRB), the UE performs a normal RRC resume procedure. Note that if the need to transmit uplink data for a non-SDT DRB arises while performing SDT, the UE is expected to perform a slightly different RRC resume procedure than in Release 15 and Release 16. This is currently under consideration by 3GPP. In this case, random access may be required, for example if no radio resources are allocated for the uplink transmission, and the UE may therefore select a random access resource for 4-step RA. However, it is unclear how the UE performs the next random access triggered for non-SDT DRB uplink data transmission when the first random access based on a feature combination including SDT and other features is in progress (or has been performed).

Still another of these problems concerns the reporting of random access-related information from UEs to the network. 3GPP Release 15 and Release 16 UEs can store a random access report (RA-Report) containing information on random access failures and transmit it to the network (e.g., gNB) in response to a network request. An RA-Report contains a cell ID (cellId), common RA-related information (ra-InformationCommon), and RA purpose (raPurpose). However, the current random Access report (RA-Report) does not contain information related to features or feature combinations that will be newly introduced in 3GPP Release 17.

One of the objects to be attained by example embodiments disclosed herein is to provide apparatuses, methods, and programs that contribute to solving at least one of a plurality of problems related to random access resource partitioning, including the problems described above. It should be noted that this object is merely one of the objects to be attained by the example embodiments disclosed herein. Other objects or problems and novel features will be made apparent from the following description and the accompanying drawings.

Solution to Problem

In a first aspect, a radio terminal includes at least one memory and at least one processor coupled to the at least one memory. The at least one processor is configured to perform a first random access using a random access resource associated with a feature combination. The at least one processor is configured to, if the first random access fails, fall back to a second random access using a random access resource associated with a feature subset included in the feature combination.

In a second aspect, a method performed by a radio terminal includes (a) performing a first random access using a random access resource associated with a feature combination, and (b) if the first random access fails, falling back to a second random access using a random access resource associated with a feature subset included in the feature combination.

In a third aspect, a radio terminal includes at least one memory and at least one processor coupled to the at least one memory. The at least one processor is configured to perform a contention-free random access (CFRA). The at least one processor is configured to, if the CFRA fails, fall back to a contention-based random access (CBRA) using a random access resource associated with a feature or a feature combination.

In a fourth aspect, a method performed by a radio terminal includes (a) performing a contention-free random access (CFRA), and (b) if the CFRA fails, falling back to a contention-based random access (CBRA) using a random access resource associated with a feature or a feature combination.

In a fifth aspect, a radio terminal includes at least one memory and at least one processor coupled to the at least one memory. The at least one processor is configured to initiate a random access to initiate a Small Data Transmission (SDT). The at least one processor is configured to, if a need to transmit uplink data unrelated to the SDT arises while performing the SDT, perform a random access using a random access resource associated with a combination of one or more features excluding the SDT.

In a sixth aspect, a method performed by a radio terminal includes (a) initiating a random access to initiate an SDT, and (b) if a need to transmit uplink data unrelated to the SDT arises while performing the SDT, performing a random access using a random access resource associated with a combination of one or more features excluding the SDT.

In a seventh aspect, a radio terminal includes at least one memory and at least one processor coupled to the at least one memory. The at least one processor is configured to perform a random access using a random access resource selected from a set of random access resources associated with a feature or a feature combination. The at least one processor is configured to, if the random access fails, include information about the feature or the feature combination in a random access report regarding a failure of the random access. The at least one processor is configured to store the random access report. The at least one processor is configured to transmit the random access report to a network.

In an eighth aspect, a method performed by a radio terminal includes the steps of:

(a) performing a random access using a random access resource selected from a set of random access resources associated with a feature or a feature combination;
(b) if the random access fails, including information about the feature or the feature combination in a random access report regarding a failure of the random access;
(c) storing the random access report; and
(d) transmitting the random access report to a network.

A ninth aspect is directed to a program. The program includes a set of instructions (software codes) that, when loaded into a computer, cause the computer to perform the method described in the second, fourth, sixth, or eighth aspect.

Advantageous Effects of Invention

According to the aspects described above, it is possible to provide apparatuses, methods and programs that contribute to solving at least one of a plurality of problems related to random access resource partitioning.

BRIEF DESCRIPTION OF DRAWINGS

FIG. 8 is a diagram showing an example of an inter-RAN node message according to an example embodiment;

EXAMPLE EMBODIMENT

Specific example embodiments will be described hereinafter in detail with reference to the drawings. The same or corresponding elements are denoted by the same symbols throughout the drawings, and duplicated explanations are omitted as necessary for the sake of clarity.

The multiple example embodiments described below may be implemented independently or in combination, as appropriate. These example embodiments include novel features different from each other. Accordingly, these example embodiments contribute to attaining objects or solving problems different from one another and contribute to obtaining advantages different from one another.

The example embodiments shown below are described primarily for the 3GPP fifth generation mobile communication system (5G system). However, these example embodiments may be applied to other radio communication systems.

As used in this specification, "if" can be interpreted to mean "when", "at or around the time", "after", "upon", "in response to determining", "in accordance with a determination", or "in response to detecting", depending on the context. These expressions can be interpreted to mean the same thing, depending on the context.

Figure 1:
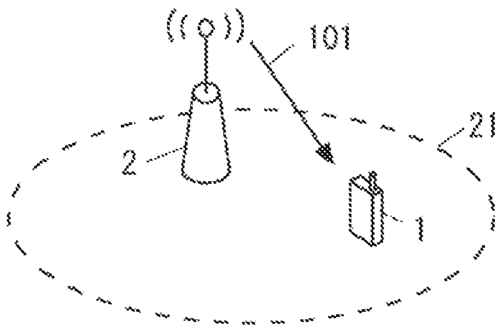
FIG. 1 shows an example configuration of a radio communication system according to an example embodiment.

First, the configuration and operation of a plurality of network elements common to a plurality of example embodiments will be described. FIG. 1 illustrates an example of the configuration of a radio communication system related to a plurality of example embodiments. In the example of FIG. 1, the radio communication system includes a radio terminal (i.e., UE) 1 and a radio access network (RAN) node (e.g., gNB) 2. Each of the elements (network functions) shown in FIG. 1 can be implemented, for example, as a network element on dedicated hardware, as a software instance running on dedicated hardware, or as a virtualized function instantiated on an application platform.

The UE 1 has at least one radio transceiver and is configured to perform cellular communications with the RAN node 2. The RAN node 2 is configured to manage a cell 21 and to perform cellular communications with a plurality of UEs, including the UE 1, using a cellular communication technology (e.g., NR Radio Access Technology (RAT)).

The RAN Node 2 may be a Central Unit (e.g., gNB-CU) in a Cloud RAN (C-RAN) deployment, or a combination of a CU and one or more Distributed Units (e.g., gNB-DUs). C-RAN is also referred to as CU/DU split. In addition, a CU may include a Control Plane (CP) unit (e.g., gNB-CU-CP) and one or more User Plane (UP) units (e.g., gNB-CU-UP). Accordingly, the RAN nodes 2 may be a CU-CP or a combination of a CU-CP and a CU-UP. A CU may be a logical node that hosts the Radio Resource Control (RRC), Service Data Adaptation Protocol (SDAP), and Packet Data Convergence Protocol (PDCP) protocols of a gNB (or the RRC and PDCP protocols of a gNB). A DU may be a logical node that hosts the Radio Link Control (RLC), Medium Access Control (MAC), and Physical (PHY) layers of a gNB.

The RAN node 2 transmits signals containing system information (SI) 101 and other signals in the cell 21. The system information 101 includes a Master Information Block (MIB) and a number of System Information Blocks (SIBs). The system information 101 is divided into Minimum SI and Other SI. The Minimum SI is always broadcast periodically and includes basic information required for initial access and information for acquiring any other SI. The Other SI includes all SIBs not broadcast in the Minimum SI. Specifically, the Minimum SI includes MIB and SIB Type 1 (SIB1), and the Other SI includes SIB types from SIB Type 2 (SIB2) and later. Each SIB in the Other SI is either always broadcast periodically, broadcast on demand upon request from UEs in RRC_IDLE or RRC_INACTIVE, or transmitted to UEs in RRC_CONNECTED via dedicated RRC signaling. If the RAN node 2 is in a C-RAN deployment, a DU (e.g., gNB-DU) may generate at least part of the system information (e.g., MIB, SIB1). The DU may transmit the generated system information directly to the UE 1 or to the CU (e.g., gNB-CU) to enable the CU to transmit it to the UE 1 (via the DU).

In the example in FIG. 1, the UE 1 has selected or reselected the cell 21 of the RAN node 2 and has camped on to cell 21. In other words, the cell 21 is a serving cell of the UE 1. The serving cell of the UE 1 can be referred to as a cell on which the UE 1 is camping. A serving cell is sometimes referred to as a camped cell. If a UE in RRC_IDLE or RRC_INACTIVE succeeds in selecting a suitable cell to camp on according to cell selection criteria or cell reselection criteria, it camps on that cell. Camping on to a cell means that the UE has completed the cell selection or reselection process and has chosen a cell. In other words, the term "camp on" means that the UE has stayed in a cell and is ready to initiate a potential dedicated service in that cell.

Figure 2:
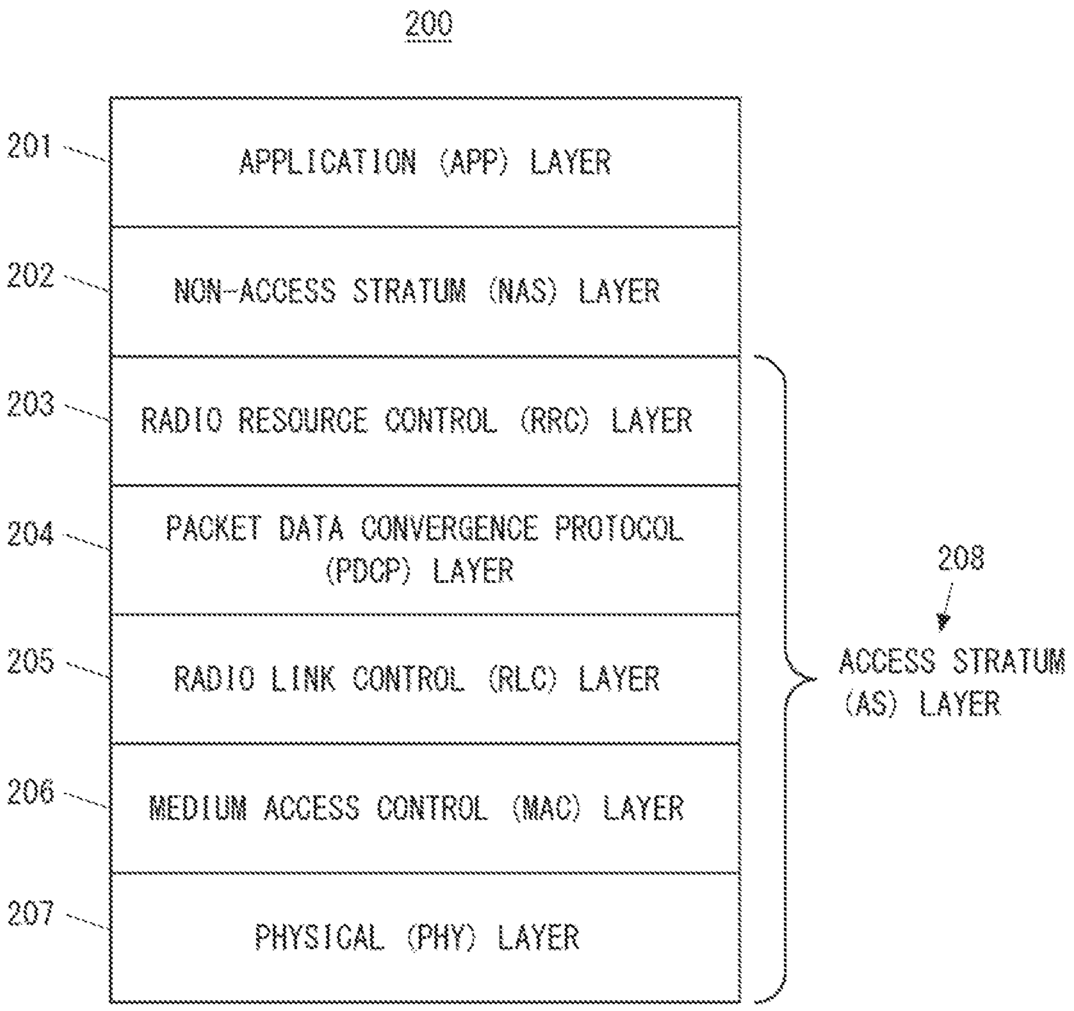
FIG. 2 shows an example of a control plane protocol stack of a radio terminal according to an example embodiment.

FIG. 2 shows an example of the control plane protocol stack of the UE 1. The control plane protocol stack 200 of the UE 1 includes an Application (APP) layer 201, a Non-Access Stratum (NAS) layer 202, and an Access Stratum (AS) layer 208. The AS layer 208 includes an RRC layer 203, a PDCP layer 204, an RLC layer 205, a MAC layer 206, and a PHY layer 207.

The NAS layer 202 utilizes data communication over a radio interface and management of the radio interface provided by the AS layer 208 and communicates with a core network (i.e., 5G Core (5GC)) via the RAN node 2 according to the 5G System (5GS) Mobility Management (5GMM) protocols and the 5GS Session Management (5 GSM) protocols. The 5GMM protocol runs between the UE 1 and an Access and Mobility Management Function (AMF) within the 5GC and is used for UE registration, mobility, and transport of 5GSM protocol messages. The 5GSM protocol runs between the UE 1 and a Session Management Function (SMF) within the 5GC via the AMF and supports management of PDU Session connectivity.

The NAS layer 202 communicates with the RRC layer 203 to utilize services provided by the AS layer 208 (i.e., data communication over the radio interface between the UE 1 and the RAN node 2 and management of the radio interface). The RRC layer 203 is a lower layer of the NAS layer 202 and provides radio resource control (RRC) and manages the RRC state (i.e., RRC_IDLE, RRC_INACTIVE, and RRC_CONNECTED) of the UE 1.

The AS layer 208 initiates an RRC connection establishment procedure or an RRC connection resume procedure in response to a request from the NAS layer 202 or on a voluntary basis. For example, in response to receiving a PDU Session establishment request from an upper layer (i.e., Application layer 201), if the 5GS mobility management (5GMM) mode of the UE 1 is 5GMM-IDLE, the NAS layer 202 initiates a registration procedure or a service request procedure to transition to 5GMM-CONNECTED mode and attempt to transmit an initial NAS message (e.g., a registration request message or a service request message) to the AMF. The initial NAS message from the NAS layer 202 triggers the AS layer 208 to establish an RRC connection between the UE 1 and the RAN node 2. If the 5GMM mode is 5GMM-CONNECTED or 5GMM-CONNECTED with RRC inactive indication, the NAS layer 202 attempts to transmit a NAS message (e.g., PDU SESSION ESTABLISHMENT REQUEST message, UL NAS TRANSPORT message, PDU SESSION MODIFICATION REQUEST, or SERVICE REQUEST message) depending on the event that triggered the access attempt. Alternatively, if the 5GMM mode is 5GMM-CONNECTED or 5GMM-CONNECTED with RRC inactive indication and the access attempt is "an uplink user data packet is to be sent for a PDU session with suspended user-plane resources", the NAS layer 202 requests the AS layer 208 to make a transition to RRC_CONNECTED in order to transmit an uplink user data packet (Mobile Originated (MO) data).

In response to receiving an initial NAS message or a request for transition to RRC_CONNECTED, the RRC layer 203 requests or triggers the MAC layer 206 to initiate a random access procedure to transmit an RRC message for establishing or resuming the RRC connection (i.e., RRC Setup Request message or RRC Resume Request message). Prior to this, the RRC layer 203 may perform one or more access barring checks. Subject to passing the access barring checks, the RRC layer 203 may request the MAC layer 206 to initiate a random access procedure. The access barring methods include, for example, Access Class Barring (ACB), Extended Access Barring (EAB), Application specific Congestion control for Data Communication (ACDC), and Unified Access Control (UAC). The RRC layer 203 may perform barring checks for one or more of these access barring methods.

The MAC layer 206 receives a trigger for a random access procedure from the RRC layer 203 based on an event such as the re-establishment and resumption of an RRC connection, and initiates the random access procedure accordingly. The MAC layer 206 may initiate a random access procedure by the MAC layer 206 itself or by a Physical Downlink Control Channel (PDCCH) order.

In a random access procedure, the MAC layer 206 selects a single RACH resource to be used for RACH preamble transmission from a set of partitioned random access resources (RACH resources). The set of RACH resources includes RACH preambles, or combinations of RACH occasions and RACH preambles. A RACH occasion is time and frequency resources for a RACH preamble transmission. According to the current 3GPP Release 15 and Release 16 specifications, there are up to 64 RACH preambles in a RACH occasion that can be used for transmission.

The MAC layer 206 requests the PHY layer 207 to transmit a random access preamble (RACH preamble) on the selected RACH resource. The random access procedure further includes Random Access Response (RAR) reception and contention resolution.

The MAC layer 206 may follow the RACH partitioning of 3GPP Release 16. With 3GPP Release 16 RACH partitioning, the UE can inform the gNB of the following information, depending on which RACH preamble is used:

Selected Synchronization Signal (SS)/Physical Broadcast Channel (PBCH) block (SSB) (or selected beam);

Contention-Free Random Access (CFRA) or Contention-Based RA (CBRA) cause;

Payload size (preamble group B configured or not);

Random access type (2-step or 4-step RA).

In addition, the MAC layer 206 supports additional RACH partitioning for Release 17 features. This allows the RAN node 2 to identify at an early stage the Release 17 features or feature combinations selected, desired, or intended by the UE 1. For example, a RACH resource partition is configured for each of all or a subset of the Release 17 features, as well as for each of the possible feature combinations or combinations of features. Each Release 17 feature is, for example, Reduced Capability (RedCap), Small Data Transmission (SDT), Coverage Enhancement (CE or CovEnh), or Slicing. For example, a feature combination includes at least two of RedCap, SDT, CovEnh, or Slicing. The term "feature" as used in the remainder of this specification means any one of these Release 17 features, unless otherwise noted. Similarly, the term "feature combination" means a combination consisting of at least two of these Release 17 features, unless otherwise noted. A "feature combination" may be referred to as a "feature set" or a "set of features.

The RedCap indication in RACH is used to indicate reduced capabilities to the network in the first RACH message (MSG1 in 4-step RA, MSGA in 2-step RA), allowing the network to adapt subsequent transmissions. Note that the 3GPP RAN Working Group is currently considering support for RedCap UEs by New Radio (NR), which will be introduced in 3GPP Release 17. The introduction of RedCap NR devices will enable support for use cases that are not optimally served by the current NR standard. Use cases motivating the NR RedCap standardization effort include wearables (e.g., smart watches, wearable medical devices, Augmented Reality (AR)/Virtual Reality (VR) goggles), industrial wireless sensors, and video surveillance. These use cases have less stringent data rate requirements than the enhanced mobile broadband (eMBB) use case and do not have the tight or deterministic latency requirements of the time-critical communications use case. Thus, there is room to trade off device features for complexity or cost savings compared to Release 15 NR devices as a baseline. According to the currently proposed capabilities of the RedCap devices, the maximum device bandwidth, the minimum number of device receive branches, the maximum number of downlink MIMO layers, and the maximum downlink modulation order may be reduced or relaxed compared to those of the Release 15 NR devices.

The SDT indication in RACH is used to indicate SDT to the network and to request a larger third RACH message (MSG3) size. Alternatively, the SDT indication is used to indicate a larger MSGA size (i.e., the size of the data portion of the MSGA) in the case of a 2-step RA. In addition, two different sizes of MSG3 or MSGA may be possible, as in the RACH in 3GPP Release 15/16. In this case, the SDT indication in the RACH may further indicate the size of the MSG3 or MSGA. The SDT, which is also referred to as the SDT in inactive state, is one of the new features to be introduced in 3GPP Release 17. It allows UEs in RRC_INACTIVE to transmit infrequent and small data without requiring an RRC state transition.

The CovEnh indication in RACH is used to indicate the need for coverage enhancement, for example, to request a repetition of the third RACH message (MSG3 in 4-step RA). The CovEnh indication can be binary information to indicate whether a Msg3 PUSCH repetition is required or not. Alternatively, the CovEnh indication may indicate one of multiple coverage enhancement (CE) levels. The CovEnh indication may indicate one of two or more CE level groups (or CE modes). A CE level group or CE mode includes one or more CE levels. For example, the CE specified in 3GPP Release 14 supports up to four CE levels (i.e., CE levels 0 to 3). The UE determines its CE level on the basis of a measured RSRP level. CE level 0 is associated with the highest RSRP threshold and CE level 3 is associated with the lowest RSRP threshold. In other words, UEs at CE level 0 enjoy relatively low path loss and high downlink received power, while UEs at CE level 3 enjoy relatively high path loss and low downlink received power.

The slicing indication in RACH is used to indicate a higher-priority slice to the network and to achieve slice isolation even for RACH. The slicing indication can be binary information to distinguish between prioritized and non-prioritized network slices. Alternatively, the slicing indication may be information indicating one of three or more multi-level slice priorities. The slicing indication may indicate a network slice or network slice group selected or intended by the UE 1. A network slice group includes one or more network slices.

Network slicing uses Network Function Virtualization (NFV) and software-defined networking (SDN) technologies to create multiple virtualized logical networks on top of physical networks. Each virtualized logical network, called a network slice or network slice instance, contains logical nodes and functions, and is used for specific traffic and signaling. A network slice may be a network slice provided by a core network (e.g., 5GC). Multiple network slices are distinguished, for example, by the services or use cases provided to the UE 1 on the respective network slice. The use cases include, for example, enhanced Mobile Broad Band (eMBB), Ultra-Reliable and Low Latency Communication (URLLC), and massive Machine Type Communication (mMTC). These are referred to as slice types (e.g., Slice/Service Type (SST)). The RAN node 2 may allocate to the UE 1 a RAN slice and a radio slice associated with the network slice of the core network selected for the UE 1, in order to provide end-to-end network slicing to the UE 1. In view of the above, the slicing indication in the RACH may be information about a network slice in the core network, information about a RAN or radio slice, or information about an end-to-end network slice.

A network slice may be specified by Network Slice Selection Assistance Information (NSSAI) or Single NSSAI (S-NSSAI). This is communicated, for example, from the core network (e.g., 5GC) to the NAS layer 202 of the UE 1, and from the NAS layer 202 of the UE 1 to the AS layer 208 (e.g., RRC). A network slice selected and intended by the UE 1 may be referred to as a selected NSSAI and an intended NSSAI, respectively. A selected network slice (selected NSSAI) may be referred to as an allowed NSSAI, meaning a network slice that has been allowed for use by the core network. An SST can be contained in an S-NSSAI (i.e., an S-NSSAI contains information about an SST).

More specifically, each of the network slices selected or intended by the UE 1 may be specified by an identifier known as Single Network Slice Selection Assistance Information (S-NSSAI). A selected or intended network slice(s) may be an S-NSSAI(s) included in a Configured NSSAI, or an S-NSSAI(s) included in an Allowed NSSAI. Note that S-NSSAIs in a Requested NSSAI included in a NAS registration request message should be part of a Configured NSSAI and/or an Allowed NSSAI. Accordingly, an intended network slice(s) may be S-NSSAI(s) included in a Requested NSSAI.

A Configured NSSAI contains one or more S-NSSAIs, each of which is applicable to one or more Public Land Mobile Networks (PLMNs). For example, a Configured NSSAI is configured by a Serving PLMN and applied to that Serving PLMN. An Allowed NSSAI specifies one or more S-NSSAIs that are provided to the UE 1 by a Serving PLMN and can be used by the UE 1 in the current Registration Area of that Serving PLMN. A Configured NSSAI may be a Default Configured NSSAI. A Default Configured NSSAI is configured by the Home PLMN (HPLMN) and applies to any PLMNs for which a specific Configured NSSAI has not been provided. The UE 1 may be pre-configured with a Default Configured NSSAI. The UE 1 may be provisioned or updated with a Default Configured NSSAI as determined by a Unified Data Management (UDM) in the HPLMN. An Allowed NSSAI is determined by an AMF of a Serving PLMN, e.g., during a registration procedure. An Allowed NSSAI is signaled to the UE 1 by the network (i.e., AMF) and stored in a (non-volatile) memory of the AMF and the UE 1, respectively.

In some implementations, the AS layer 208 may determine or select a feature combination. In one example, the RRC layer 203 of the UE 1 may determine or select a feature combination. Specifically, the RRC layer 203 of the UE 1 may determine a feature combination and indicate the determined feature combination to the MAC layer 206 of the UE 1. Alternatively, the final determination or selection of a feature combination may be performed by the MAC layer 206 of the UE 1. Specifically, the RRC layer 203 of the UE 1 may determine one or more features to be included in a feature combination and may indicate the determined one or more features to the MAC layer 206 of the UE 1. The MAC layer 206 may further determine required features and determine the feature combination.

In other implementations, the NAS layer 202 may determine or select a feature combination. The NAS layer 208 may indicate the feature combination to the AS layer 208 (e.g., RRC layer 203).

First Example Embodiment

The example configuration of a radio communication system in this example embodiment may be similar to the example shown in FIG. 1. The control plane protocol stack of the UE 1 may be similar to the example shown in FIG. 2.

Figure 3:
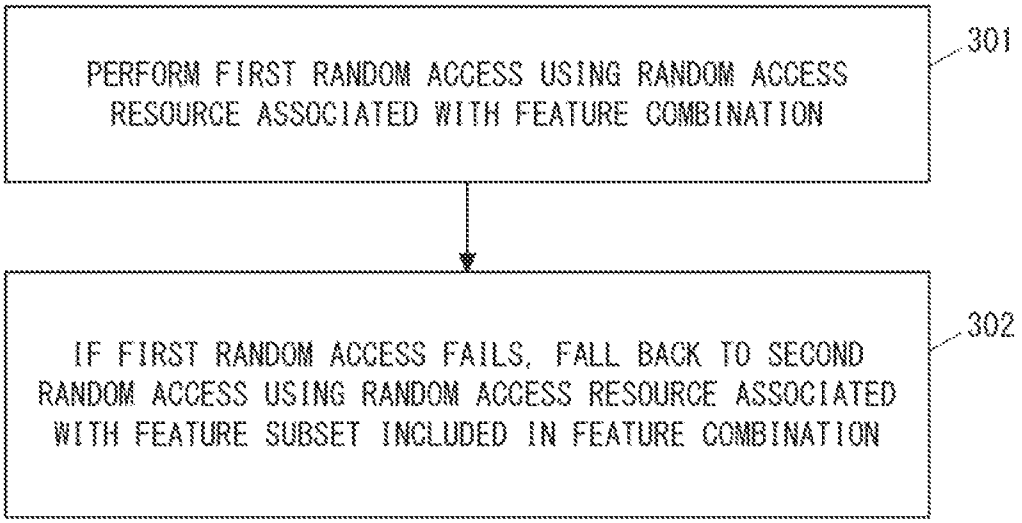
FIG. 3 is a flowchart showing an example of the operation of a radio terminal according to an example embodiment.

FIG. 3 shows an example of the operation of the UE 1 in a random access procedure. In step 301, the UE 1 performs a random access (hereinafter referred to as the first random access) using a random access resource associated with a feature combination selected, desired, or intended by the UE 1. The feature combination may include two or more of RedCap, SDT, CovEnh, or Slicing.

As described above, in an example, the RRC layer 203 of the UE 1 may determine the feature combination and indicate the determined feature combination to the MAC layer 206 of the UE 1. The MAC layer 206 may select a resource for random access preamble transmission from a set of random access resources associated with the feature combination. The MAC layer 206 may then request the PHY layer 207 to transmit a random access preamble on the selected preamble resource. Alternatively, the RRC layer 203 of the UE 1 may determine one or more features to be included in the feature combination and indicate the one or more determined features to the MAC layer 206 of the UE 1. The MAC layer 206 may further determine required features, determine the feature combination, and select a resource for random access preamble transmission from a set of random access resources associated with the feature combination.

In step 302, if the first random access fails, the UE 1 falls back to a random access using a random access resource associated with a feature subset included in the feature combination (hereinafter referred to as the second random access). The feature subset may be referred to as a subset of features, a feature subcombination, or a subcombination of features. The feature subset includes one or more features. The feature subset may include at least one of RedCap, SDT, CovEnh, or Slicing.

A failure of the first random access may mean that the number of preamble transmissions has reached a predetermined number (i.e., the maximum number of preamble transmissions), but the random access has not been completed. A failure of the first random access may mean that the initiated random access procedure has not yet been completed successfully or unsuccessfully. A failure of the first random access may be caused by successive failures of random access response (i.e., MSG2 in 4-step RA, or MSGB in 2-step RA) reception, or successive failures of contention resolution, or both. In other words, a failure of the first random access may be caused by successive failures to transmit the random access preamble (MSG1 in 4-step RA, MSGA in 2-step RA), or successive failures to transmit the third RACH message (MSG3 in 4-step RA), or both. The maximum number of preamble transmissions can be configured per feature combination. Additionally or alternatively, the maximum number of transmissions per feature may be configured and the UE 1 may apply the maximum of the multiple values of the maximum number of transmissions associated with the plurality of features included in the feature combination. Additionally or alternatively, the maximum number of transmissions per feature may be configured, and the UE 1 may apply the value of the maximum number of transmissions configured for the most prioritized feature among the plurality of features included in the feature combination.

For example, if the feature combination considered in the first random access is SDT+Slicing, the feature subset considered in the second random access can be SDT or Slicing. If the feature combination considered in the first random access is RedCap+SDT+Slicing, the feature subset considered in the second random access can be RedCap, RedCap+SDT, or RedCap+Slicing.

In general, the set (or partition) of random access resources reserved for a feature subset is considered to be larger than the set (or partition) of random access resources reserved for a feature combination. Accordingly, the operation described with reference to FIG. 3 can help improve the probability of random access success.

When selecting a feature subset in step 302, it may be preferable for the UE 1 to select one or more features that are prioritized or important over other features. This allows the RAN node 2 to identify the prioritized or important features at an early stage.

In an example, if the feature combination considered for the first random access includes Slicing and one or more other features, then the UE 1 (MAC layer 206) selects a feature subset consisting only of Slicing and selects a random access resource associated with that feature subset for the second random access. This behavior allows RAN node 2 to identify early on the feature(s) (here, slicing) that is preferred or important over other features.

In another example, if the feature combination considered for the first random access includes one or both of CovEnh and RedCap and one or more other features, then the UE 1 (MAC layer 206) selects a feature subset consisting of only one or both of CovEnh and RedCap and selects a random access resource associated with that feature subset for the second random access. This behavior allows RAN node 2 to identify early on the feature(s) (here, one or both of CovEnh and RedCap) that is preferred or important over other features.

Second Example Embodiment

The example configuration of a radio communication system in this example embodiment may be similar to the example shown in FIG. 1. The control plane protocol stack of the UE 1 may be similar to the example shown in FIG. 2.

Figure 4:
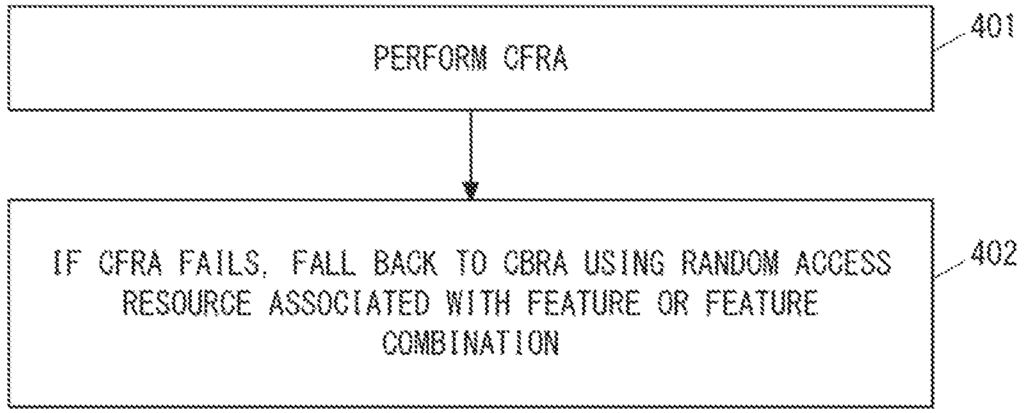
FIG. 4 is a flowchart showing an example of the operation of a radio terminal according to an example embodiment.

FIG. 4 shows an example of the operation of the UE 1 in a random access procedure. In step 401, the UE 1 (MAC layer 206) performs a contention-free random access (CFRA). In this CFRA, the UE 1 uses a contention-free random access resource that is explicitly provided to the UE 1 by the RAN node 2 via dedicated RRC signaling. The UE 1 may perform the CFRA of step 401 during handover, i.e., when accessing a target cell in a handover.

In step 402, if the CFRA fails, the UE 1 falls back to a contention-based random access (CBRA). In this CBRA, the MAC layer 206 selects a resource for preamble transmission from a set of random access resources associated with a feature combination selected, desired, or intended by the UE 1. Specifically, the RRC layer 203 of the UE 1 may determine the feature or feature combination and indicate the determined feature or feature combination to the MAC layer 206 of the UE 1. The MAC layer 206 may select a resource for random access preamble transmission from a set of random access resources associated with the feature or feature combination indicated by the RRC layer 203. The MAC layer 206 may request the PHY layer 207 to transmit a random access preamble on the selected preamble resource.

The feature may be RedCap, SDT, CovEnh, or Slicing. The feature combination may include two or more of RedCap, SDT, CovEnh, or Slicing.

A failure of the CFRA may mean an unsuccessful completion of the CFRA procedure. A failure of the CFRA can be caused by successive failures of random access response (i.e., MSG2 in 4-step RA, or MSGB in 2-step RA) reception. In other words, a failure of CFRA can be caused by successive failures of random access preamble (MSG1 in 4-step RA, MSGA in 2-step RA) transmission. Alternatively, if the CFRA is performed during a handover, a failure of the CFRA may mean that the handover was not successful within a certain time period.

According to the behavior described with reference to FIG. 4, in a CBRA following a CFRA failure, the UE 1 can inform the RAN node 2 at an early stage of a feature or feature combination selected, desired, or intended by the UE 1.

Third Example Embodiment

The example configuration of a radio communication system in this example embodiment may be similar to the example shown in FIG. 1. The control plane protocol stack of the UE 1 may be similar to the example shown in FIG. 2.

Figure 5:
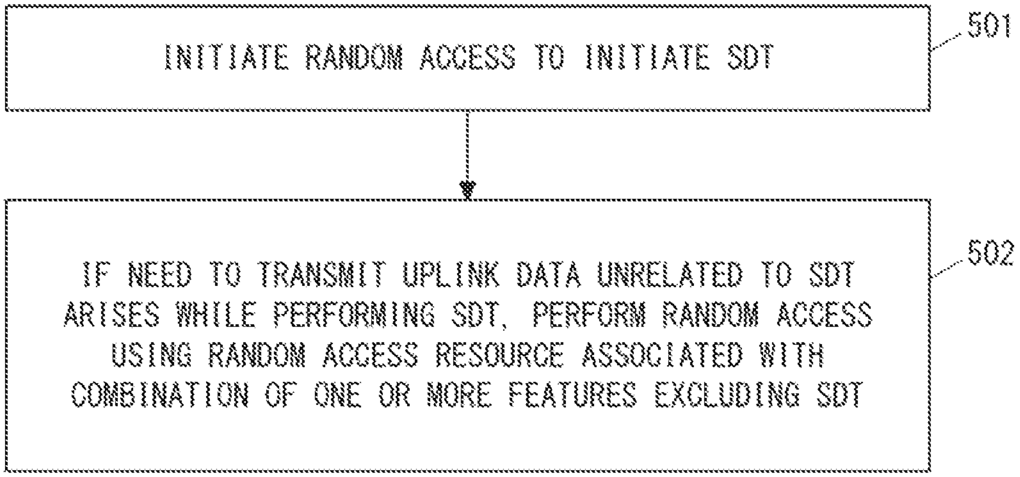
FIG. 5 is a flowchart showing an example of the operation of a radio terminal according to an example embodiment.

FIG. 5 shows an example of the operation of the UE 1 in a random access procedure. In step 501, the UE 1 initiates a random access to initiate an SDT. In this random access, the UE 1 may transmit a random access preamble with a random access resource associated with a feature combination that includes the feature "SDT". Specifically, the RRC layer 203 of the UE 1 may determine a feature combination including the feature "SDT" and indicate it to the MAC layer 206 of the UE 1. The MAC layer 206 may select a resource for random access preamble transmission from a set of random access resources associated with the feature combination including the "SDT". The MAC layer 206 may then request the PHY layer 207 to transmit a random access preamble on the selected preamble resource. The feature combination including the feature "SDT" may include at least one of RedCap, CovEnh, or Slicing in addition to SDT.

In step 502, if the need to transmit uplink data unrelated to the SDT arises while performing the SDT, the UE 1 performs a random access using a random access resource associated with a combination of one or more features excluding the SDT. The uplink data unrelated to the SDT is uplink data of any other DRB (non-SDT DRB) for which the SDT is not allowed. The combination of one or more features excluding the SDT may be the remaining one or more features, excluding the SDT, included in the feature combination considered in step 501. Alternatively, the combination of one or more features excluding the SDT may be a feature or feature combination corresponding to a non-SDT DRB.

According to the behavior described with reference to FIG. 5, when the first random access based on a feature combination including SDT and one or more other features is in progress (or has been performed), the UE 1 can properly perform the next random access for uplink data transmission in a non-SDT DRB. For example, if the UE 1 is not allocated with radio resources for uplink transmission to perform a slightly different RRC resume procedure (e.g., involving transmission of necessary RRC resume information in DCCH) than in Release 15 and Release 16, the UE 1 can perform step 502 of this example embodiment, which allows the network (e.g., RAN node 2) to identify features associated with the non-SDT DRB in an early manner.

Fourth Example Embodiment

The example configuration of a radio communication system in this example embodiment may be similar to the example shown in FIG. 1. The control plane protocol stack of the UE 1 may be similar to the example shown in FIG. 2.

Figure 6:
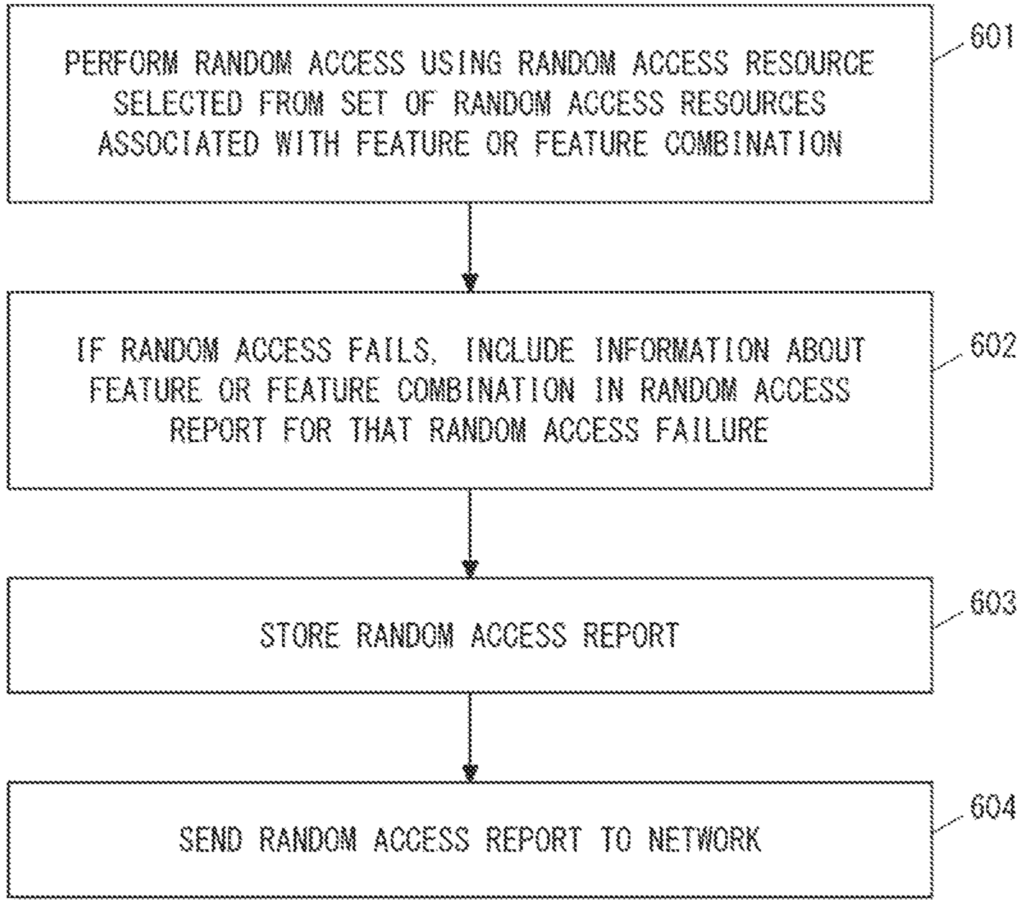
FIG. 6 is a flowchart showing an example of the operation of a radio terminal according to an example embodiment.

FIG. 6 shows an example of the operation of the UE 1. The operation of FIG. 6 relates to the reporting of random access related information from the UE 1 to the network (e.g., RAN node 2). In step 601, the UE 1 performs a random access using a random access resource selected from a set of random access resources associated with a feature or feature combination. The feature is RedCap, SDT, CovEnh, or Slicing. The feature combination includes two or more of RedCap, SDT, CovEnh, or Slicing.

As described above, in an example, the RRC layer 203 of the UE 1 may determine the feature or feature combination and indicate the determined feature or feature combination to the MAC layer 206 of the UE 1. The MAC layer 206 may select a resource for random access preamble transmission from a set of random access resources associated with the feature or feature combination indicated by the RRC layer 203. The MAC layer 206 may request the PHY layer 207 to transmit a random access preamble on the selected preamble resource. Alternatively, the RRC layer 203 of the UE 1 may determine one or more features to be included in the feature combination and indicate the determined one or more features to the MAC layer 206 of the UE 1. The MAC layer 206 may further determine required features, determine the feature combination, and select a resource for random access preamble transmission from a set of random access resources associated with the feature combination.

In step 602, if the random access of step 601 failed, the UE 1 includes information about the feature or feature combination in a random access report (e.g., RA-Report) regarding failures of that random access. Specifically, in response to a random access failure, the MAC layer 206 may indicate the random access failure or problem to the RRC layer 203. Based on the random access failure or problem indicated by the MAC layer 206, the RRC layer 203 may store information about the feature or feature combination in a memory (e.g., VarRA-Report) for a random access report (e.g., RA-Report) for failures of that random access.

A failure of random access may mean an unsuccessful completion of the random access procedure. A failure of random access may be caused by successive failures of random access response (i.e., MSG2 in 4-step RA, or MSGB in 2-step RA) reception, or successive failures of contention resolution, or both. In other words, a failure of random access may be caused by successive failures to transmit the random access preamble (MSG1 in 4-step RA, MSGA in 2-step RA) transmissions, or successive failures to transmit the third RACH message (MSG3 in 4-step RA), or both.

In one implementation, the UE 1 (e.g., RRC layer 203) may set a raPurpose field, which is included in the random access report and is used to indicate the purpose of the random access, to indicate the information about the feature or feature combination. This may be an extension (e.g., raPurpose-v17xy, or raPurpose-v18xy) of the raPurpose field in Release 15 and/or Release 16.

In another implementation, the UE 1 (e.g., RRC layer 203) may set a new field (e.g., raFeatureCombination, or raFC) included in the random access report to indicate the information about the feature or feature combination.

In step 603, the UE 1 stores the random access report generated in step 602 in memory. Step 603 may be performed by the RRC layer 203.

Figure 7:
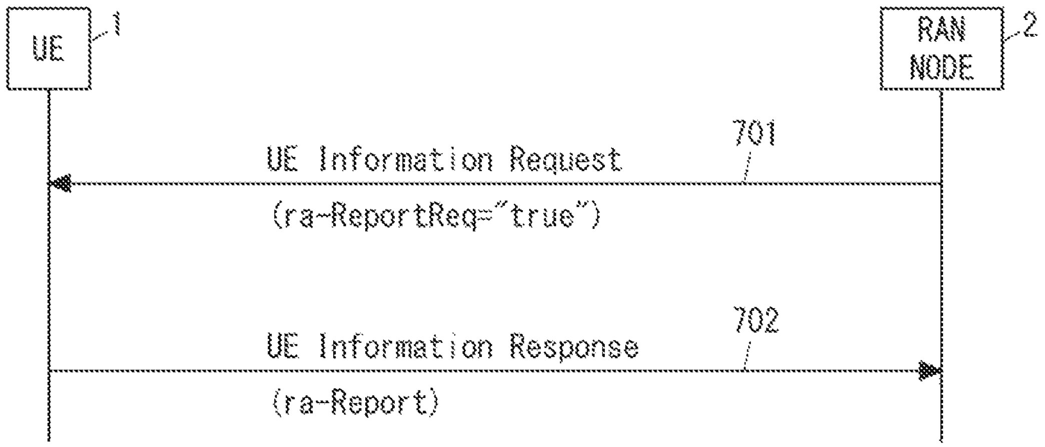
FIG. 7 is a sequence diagram showing an example of the operation of a radio terminal and a radio access network node according to an example embodiment.

In step 604, the UE 1 transmits the stored random access report to the network (e.g., RAN node 2). Step 604 may be performed by the RRC layer 203. The RRC layer 203 may transmit the random access report to the RAN node 2 in response to a request from the RAN node 2. In particular, the UE 1 and the RAN node 2 may operate as shown in FIG. 7. The RAN node 2 transmits a UE Information Request message to the UE 1 (step 701). The UE Information Request message is an RRC message and is used by the network to retrieve information from the UE 1. In step 701, the UE Information Request message contains a ra-ReportReq field set to true. In response to this message, the UE 1 sets the stored random access report into the given field (e.g., the ra-Report field) of a UE Information Response message and transmits the UE Information Response message to the RAN node 2 (step 702).

According to the behavior described with reference to FIG. 6 and FIG. 7, the UE 1 can provide the RAN node 2 with a random access report containing information related to a feature or feature combination to be introduced in 3GPP Release 17. This can be used, for example, by the RAN node 2, an Operation, Administration and Maintenance (OAM), or a network operator to optimize the random access resource partitioning.

As an example, not a limitation, the operation shown in FIG. 6 can be modified or detailed as follows. These modifications allow the network to be informed of the details of a random access failure based on a feature or feature combination.

In step 601, the UE 1 may perform a fallback from preamble transmission using a random access resource associated with a feature combination to preamble transmission using a random access resource associated with a feature subset included in that feature combination (hereinafter referred to as the first fallback). The feature subset includes one or more features. It may be referred to as a subset of features, a feature subcombination, or a subcombination of features. For example, if the feature combination is RedCap+Slicing, the feature subset can be RedCap. If the feature combination is RedCap+CovEnh+Slicing, the feature subset can be RedCap+CovEnh, RedCap, or CovEnh. If the first fallback was performed in step 601, the UE 1 may include information about the first fallback in the random access report in step 602.

Additionally or alternatively, in step 601, the UE 1 may perform a fallback from preamble transmission using a random access resource associated with a feature or feature combination to preamble transmission using a random access resource not associated with that feature or feature combination (hereinafter referred to as the second fallback). In the second fallback, the UE 1 may perform a random access resource selection in the same way as the random access procedures of 3GPP Release 15 and/or Release 16. If the second fallback was performed in step 601, the UE 1 may include information about the second fallback in the random access report in step 602.

The RAN node 2 may send the random access report received from the UE 1 to a neighboring (or adjacent) RAN node 2, e.g., by including it in the RACH Report Container IE of an Xn ACCESS AND MOBILITY INDICATION message.

Fifth Example Embodiment

The example configuration of a radio communication system in this example embodiment may be similar to the example shown in FIG. 1.

FIG. 8 shows an example of the information about random access (e.g., Physical RACH (PRACH)) resources transmitted in an Xn message between RAN node 2 and a neighboring (or adjacent) RAN node in this example embodiment. The Xn message may be, for example, Xn SETUP, Xn SETUP RESPONSE, NG-RAN NODE CONFIGURATION UPDATE, or NG-RAN NODE CONFIGURATION UPDATE ACKNOWLEDGE. The RAN node 2 may include information about the support of RACH resources associated with feature combinations in the PRACH configuration information (NR PRACH Configuration) within the information (Served Cell Information) about a cell that the RAN node 2 itself manages. The information about the support of RACH resources associated with feature combinations can be, for example, but not limited to, a Feature Set Combination Information Element (IE), a Feature Set Combination-based PRACH IE, or a PRACH per Feature Set Combination IE.

For example, as shown in FIG. 8 as option 1, the information about the support of RACH resources associated with feature combinations (e.g., Feature Set Combination IE) can be information indicating that the feature is supported (or that it is configured in the cell) (e.g., ENUMERATED (true, . . . )). Alternatively, as shown in FIG. 8 as option 2, the information may be in the form of a bitmap (e.g., BITSTRING (SIZE (32))) for feature combinations. In this case, what each bit indicates (i.e., which feature combination each bit corresponds to) can be specified in advance, e.g., in the standard specifications.

This allows the RAN node 2 to know whether RACH resources associated with feature combinations are supported by neighboring (or adjacent) RAN nodes. The RAN node 2 can use this information, for example, to determine a target cell for a handover of the UE 1 or to configure radio parameters (e.g., Qoffset, frequency priority) to be used by the UE 1 for cell (re) selection. This can help to optimize the mobility of the UE 1. Similar information may be contained in an F1 message between a CU (e.g., gNB-CU) and a DU (e.g., gNB-DU) in a C-RAN deployment. The F1 message may be, for example, F1 SETUP REQUEST, F1 SETUP RESPONSE, GNB-DU CONFIGURATION UPDATE, or GNB-DU CONFIGURATION UPDATE ACKNOWLEDGE.

Sixth Example Embodiment

The example configuration of a radio communication system in this example embodiment may be similar to the example shown in FIG. 1. The control plane protocol stack of the UE 1 may be similar to the example shown in FIG. 2.

This example embodiment relates to the handling of features and feature combinations selected, desired, or intended by the UE 1. The features can be divided into at least two types. In the first type, the MAC layer 206 of the UE 1 determines whether or not the feature needs to be executed (or whether or not the feature can be executed) based on information or conditions that it possesses. Additionally or alternatively, the MAC layer 206 may make the above determination based on information received from or specified by the upper layers (e.g., RRC layer 203) of the UE 1. For this type, if the MAC layer 206 of the UE 1 determines that at least one feature of the selected, desired, or intended feature combination does not need to be (or cannot be) performed, the MAC layer 206 may change the content of the feature combination (i.e., the included features) and select a RACH resource for the remaining features or feature combinations except for that feature. In other words, the MAC layer 206 may select a feature subset that excludes a feature that does not need to be (or cannot be) performed. In this case, the MAC layer 206 may communicate the decision results (e.g., information regarding the feature combination subject to be performed, information regarding the feature(s) to be excluded) to the RRC layer 203.

The second type is one in which the MAC layer 206 of the UE 1 does not or should not determine whether or not the feature needs to be executed (or whether or not the feature can be executed). In this type, the RRC layer 203 of the UE 1 determines whether or not the feature needs to be performed (or whether or not the feature can be performed) and informs the MAC layer 206 of the necessary information. The determination by the RRC layer 203 may be based on one or both of the capability of the UE 1 (UE capability) and predetermined information possessed by the RRC layer 203. Additionally or alternatively, the RRC layer 203 may make the above determination based on information received from or specified by a further higher layer (e.g., the NAS layer 202) of the UE 1. The MAC layer 206 selects a RACH resource corresponding to that feature or a feature combination including that feature. If the MAC layer 206 determines that there is no RACH resource corresponding to that feature, it may report a failure indication to the RRC layer 203 regarding the RACH resource selection. On the other hand, if the MAC layer 206 determines that there is no RACH resource corresponding to a feature combination including that second type of feature, the MAC layer 206 may exclude any one or more features of the first type from the feature combination and select a RACH resource corresponding to a feature subset including that second type of feature and the remainder of the features of the first type. Alternatively, the MAC layer 206 may select a RACH resource corresponding to only the second type of feature. In other words, when a feature subset needs to be selected from the feature combination, the MAC layer 206 may ensure that the feature subset includes one or more second type features (e.g., RedCap) that are included in the feature combination. The MAC layer 206 may then adjust the number of features in the feature subset depending on whether or not the first type features included in the feature combination are to be included in the feature subset.

The feature combination selected, desired, or intended by the UE 1 may include only one of the above two types or both of the two types. If the feature combination includes both of the two types, the MAC layer 206 may preferentially consider the second type of features. For example, the MAC layer 206 may preferentially perform the second type of features. The MAC layer 206 may preferentially select a RACH resource corresponding to the second type of features. For example, in step 302 of FIG. 3, described in the first example embodiment, the UE 1 (MAC layer 206) may preferentially choose the second type of feature when determining the feature subset.

Figure 9:
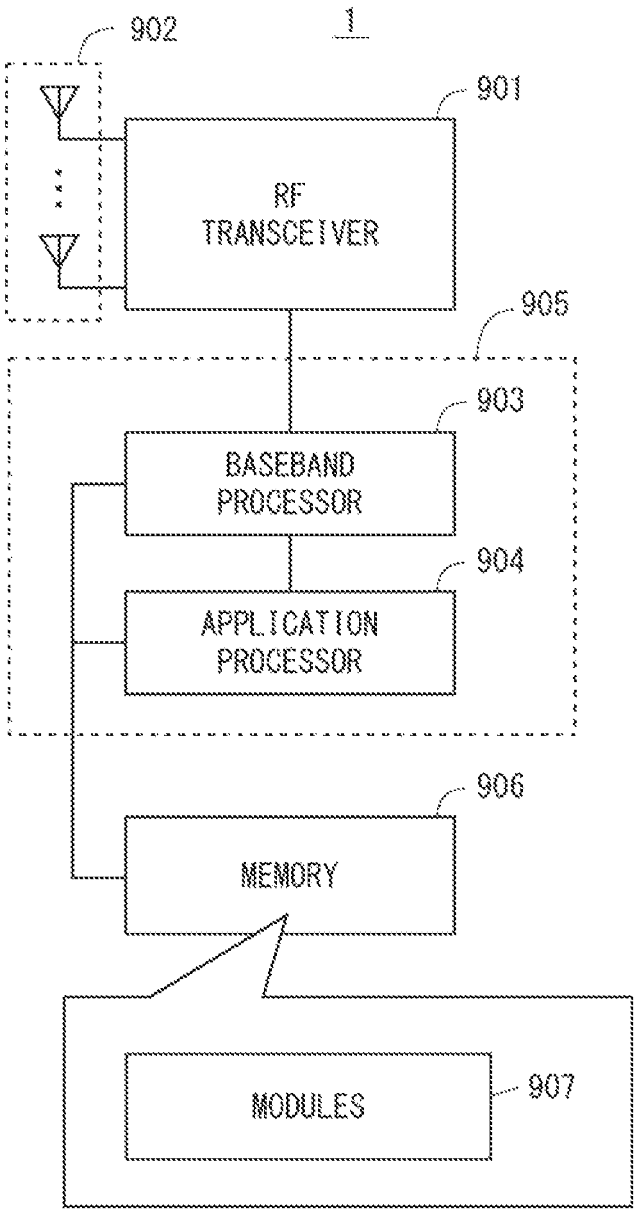
FIG. 9 is a block diagram showing an example configuration of a radio terminal according to an example embodiment.

The following provides configuration examples of the UE 1 and the RAN node 2 according to the above described example embodiments. FIG. 9 is a block diagram showing an example configuration of the UE 1. The radio frequency (RF) transceiver 901 performs analog RF signal processing to communicate with a RAN node. The RF transceiver 901 may include a plurality of transceivers. The analog RF signal processing performed by the RF transceiver 901 includes frequency up-conversion, frequency down-conversion, and amplification. The RF transceiver 901 is coupled to the antenna array 902 and the baseband processor 903. The RF transceiver 901 receives modulation symbol data (or OFDM symbol data) from the baseband processor 903, generates a transmission RF signal, and supplies the transmission RF signal to the antenna array 902. The RF transceiver 901 generates a baseband reception signal based on the reception RF signal received by the antenna array 902 and supplies the baseband reception signal to the baseband processor 903. The RF transceiver 901 may include an analog beamformer circuit for beamforming. The analog beamformer circuit includes, for example, a plurality of phase shifters and a plurality of power amplifiers.

The baseband processor 903 performs digital baseband signal processing (data-plane processing) and control-plane processing for wireless communication. The digital baseband signal processing includes (a) data compression/decompression, (b) data segmentation/concatenation, (c) transmission format (transmission frame) composition/decomposition, (d) channel encoding/decoding, (e) modulation (i.e., symbol mapping)/demodulation, and (f) Inverse Fast Fourier Transform (IFFT) generation of OFDM symbol data (baseband OFDM signal). On the other hand, the control-plane processing includes communication management of layer 1 (e.g., transmission power control), layer 2 (e.g., radio resource management, and hybrid automatic repeat request (HARQ) processing), and layer 3 (e.g., signaling regarding attachment, mobility, and call management).

For example, the digital baseband signal processing performed by the baseband processor 903 may include signal processing in the Service Data Adaptation Protocol (SDAP) layer, Packet Data Convergence Protocol (PDCP) layer, Radio Link Control (RLC) layer, Medium Access Control (MAC) layer, and Physical (PHY) layer. The control-plane processing performed by the baseband processor 903 may also include processing of Non-Access Stratum (NAS) protocols, Radio Resource Control (RRC) protocols, MAC Control Elements (CEs), and Downlink Control Information (DCIs).

The baseband processor 903 may perform Multiple Input Multiple Output (MIMO) encoding and precoding for beamforming.

The baseband processor 903 may include a modem processor (e.g., Digital Signal Processor (DSP)) that performs the digital baseband signal processing and a protocol stack processor (e.g., Central Processing Unit (CPU) or Micro Processing Unit (MPU)) that performs the control-plane processing. In this case, the protocol stack processor performing the control-plane processing may be integrated with an application processor 904 described later.

The application processor 904 may also be referred to as a CPU, an MPU, a microprocessor, or a processor core. The application processor 904 may include a plurality of processors (processor cores). The application processor 904 loads a system software program (Operating System (OS)) and various application programs (e.g., a voice call application, a web browser, a mailer, a camera operation application, a music player application) from a memory 906 or from another memory (not shown) and executes these programs, thereby providing various functions of the UE 1.

In some implementations, as represented by the dashed line (905) in FIG. 9, the baseband processor 903 and the application processor 904 may be integrated on a single chip. In other words, the baseband processor 903 and the application processor 904 may be implemented in a single System on Chip (SoC) device 905. A SoC device may be referred to as a system Large Scale Integration (LSI) or a chipset.

The memory 906 is a volatile memory or a non-volatile memory, or a combination thereof. The memory 906 may include a plurality of physically independent memory devices. The volatile memory is, for example, Static Random Access Memory (SRAM), Dynamic RAM (DRAM), or a combination thereof. The non-volatile memory may be a Mask Read Only Memory (MROM), an Electrically Erasable Programmable ROM (EEPROM), a flash memory, a hard disk drive, or any combination thereof. The memory 906 may include, for example, an external memory device that can be accessed by the baseband processor 903, the application processor 904, or the SoC 905. The memory 906 may include an internal memory device that is integrated into the baseband processor 903, the application processor 904, or the SoC 905. Further, the memory 906 may include a memory in a Universal Integrated Circuit Card (UICC).

The memory 906 may store one or more software modules (computer programs) 907 including instructions and data for processing by the UE 1 described in the above example embodiments. In some implementations, the baseband processor 903 or the application processor 904 may load the software module(s) 907 from the memory 906 and execute the loaded software module(s) 907, thereby performing the processing of the UE 1 described in the above example embodiments with reference to the drawings.

The control-plane processing and operations performed by the UE 1 described in the above embodiments can be achieved by elements other than the RF transceiver 901 and the antenna array 902, i.e., achieved by the memory 906, which stores the software modules 907, and one or both of the baseband processor 903 and the application processor 904.

Figure 10:
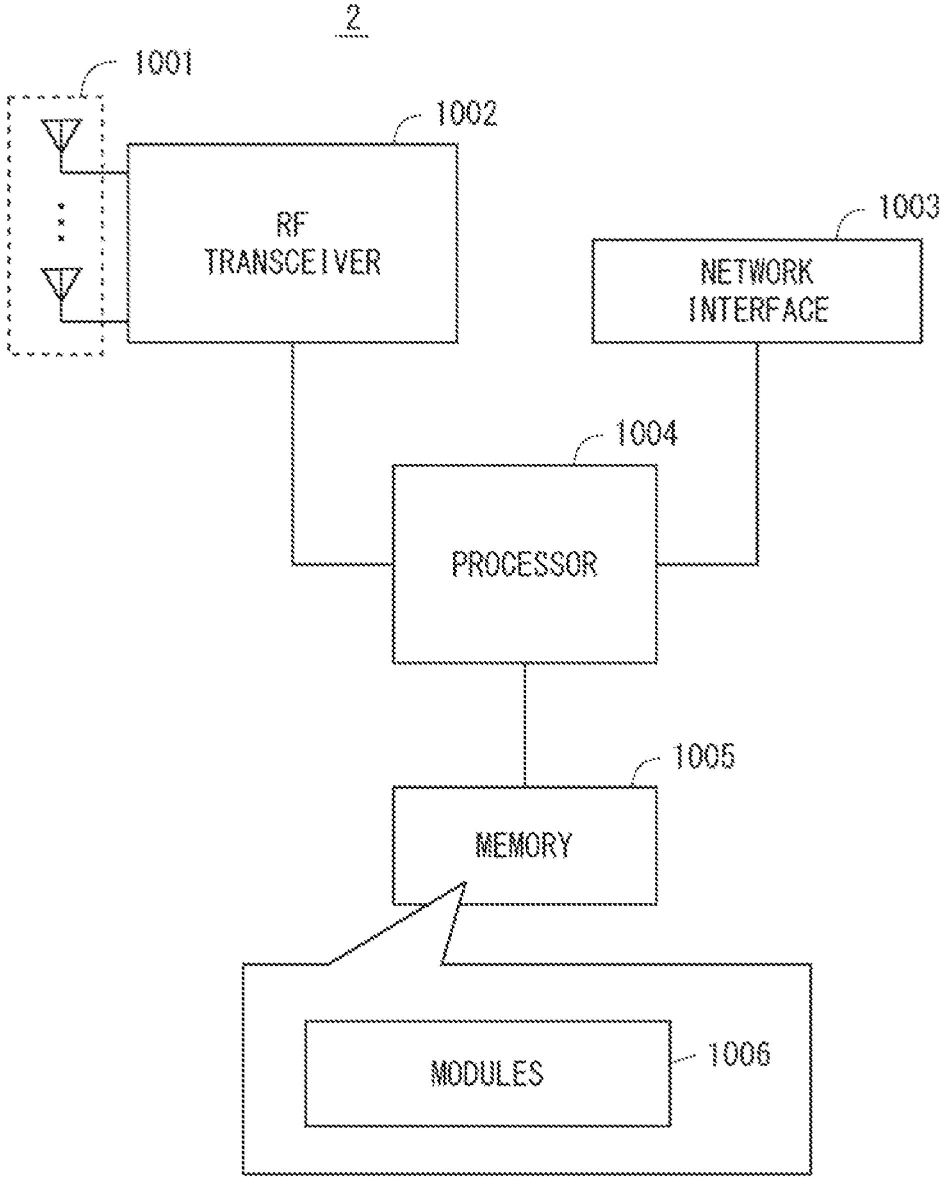
FIG. 10 is a block diagram showing an example configuration of a radio access network node according to an example embodiment.

FIG. 10 is a block diagram showing an example configuration of the RAN node 2 according to the above example embodiments. Referring to FIG. 10, the RAN node 2 includes a Radio Frequency transceiver 1001, a network interface 1003, a processor 1004, and a memory 1005. The RF transceiver 1001 performs analog RF signal processing to communicate with UEs including the UE 1. The RF transceiver 1001 may include a plurality of transceivers. The RF transceiver 1001 is coupled to an antenna array 1002 and the processor 1004. The RF transceiver 1001 receives modulated symbol data from the processor 1004, generates a transmission RF signal, and supplies the transmission RF signal to the antenna array 1002. Further, the RF transceiver 1001 generates a baseband reception signal based on a reception RF signal received by the antenna array 1002 and supplies the baseband reception signal to the processor 1004. The RF transceiver 1001 may include an analog beamformer circuit for beam forming. The analog beamformer circuit includes, for example, a plurality of phase shifters and a plurality of power amplifiers.

The network interface 1003 is used to communicate with network nodes (e.g., SN 2, and control and transfer nodes in the core network). The network interface 1003 may include, for example, a network interface card (NIC) conforming to the IEEE 802.3 series.

The processor 1004 performs digital baseband signal processing (i.e., data-plane processing) and control-plane processing for radio communication. The processor 1004 may include a plurality of processors. The processor 1004 may include, for example, a modem processor (e.g., Digital Signal Processor (DSP)) that performs digital baseband signal processing and a protocol stack processor (e.g., Central Processing Unit (CPU) or Micro Processing Unit (MPU) that performs the control-plane processing. The processor 1004 may include a digital beamformer module for beam forming. The digital beamformer module may include a Multiple Input Multiple Output (MIMO) encoder and a precoder.

The memory 1005 is composed of a combination of a volatile memory and a non-volatile memory. The volatile memory is, for example, a Static Random Access Memory (SRAM), a Dynamic RAM (DRAM), or a combination thereof. The non-volatile memory is, for example, a Mask Read Only Memory (MROM), an Electrically Erasable Programmable ROM (EEPROM), a flash memory, a hard disk drive, or any combination thereof. The memory 1005 may include a storage located that is separate from the processor 1004. In this case, the processor 1004 may access the memory 1005 through the network interface 1003 or an I/O interface not shown.

The memory 1005 may store one or more software modules (computer programs) 1006 including instructions and data for performing the processing of the RAN node 2 described in the above example embodiments. In some implementations, the processor 1004 may be configured to load these software modules 1006 from the memory 1005 and execute the loaded software modules, thereby performing the processing of the RAN node 2 described in the above example embodiments.

If the RAN node 2 is a CU (e.g., gNB-CU) or CU-CP (e.g., gNB-CU-CP), the RAN node 2 does not need to include the RF transceiver 1001 (and antenna array 1002).

As described using FIGS. 9 and 10, each of the processors in the UE 1 and RAN node 2 according to the example embodiments described above can execute one or more programs, containing a set of instructions, for causing a computer to perform an algorithm described with reference to the drawings. Each of these programs contains a set of instructions (or software codes) that, when loaded into a computer, causes the computer to perform one or more of the functions described in the example embodiments. Each of these programs may be stored in a non-transitory computer readable medium or a tangible storage medium. By way of example, and not limitation, non-transitory computer readable media or tangible storage media can include a random-access memory (RAM), a read-only memory (ROM), a flash memory, a solid-state drive (SSD) or other memory technologies, CD-ROM, digital versatile disk (DVD), Blu-ray (registered mark) disc or other optical disk storage, magnetic cassettes, magnetic tape, magnetic disk storage or other magnetic storage devices. Each program may be transmitted on a transitory computer readable medium or a communication medium. By way of example, but not limitation, transitory computer readable media or communication media can include electrical, optical, acoustical, or other form of propagated signals.

Other Example Embodiments

The "features" in the example embodiments described above may be new features to be introduced in future 3GPP Release 18 or later. Similarly, the "feature combinations" in the example embodiments described above may include new features to be introduced in future 3GPP Release 18 or later. For example, in addition to Mobile Originated (MO) SDT to be introduced in Release 17, Mobile Terminated (MT) SDT will also be introduced in 3GPP Release 18. In an implementation, the MT-SDT feature may be distinguished from the MO-SDT feature, and a separate RACH resource set (or partition, or pool) may be configured for the MT-SDT feature. In this case, a feature combination may include MT-SDT. The RAN node 2 may inform the UE 1 via broadcast (e.g., SIB) or dedicated RRC signaling whether or not MO-SDT is distinguished from MT-SDT in the RACH resource partitioning. Specifically, a random access configuration (e.g., RACH-Config) transmitted by the RAN node 2 to the UE 1 may include a 1-bit flag (e.g., "mt-SDT") as an optional element. If the random access configuration includes this flag, the UE 1 may use the RACH resource set for the (MO-) SDT feature also for MT-SDT. Conversely, if the random access configuration does not include this flag, the UE 1 checks whether a separate RACH resource set (or partition, or pool) is configured for MT-SDT and, if so, uses the separate RACH resource set for MT-SDT. If the flag is not included in the random access configuration and no separate RACH resource set is configured for MT-SDT, the UE 1 may understand that MT-SDT is not supported. In this case, if the UE 1 triggers MT-SDT, the UE 1 may use the RACH resource set for the (MO-) SDT feature also for MT-SDT, or use a RACH resource set similar to that of Release 15 and/or Release 16 also for MT-SDT.

In the example embodiments described above, if a configuration (e.g., Random Access Configuration) received via RRC signaling (e.g., SIB) contains a configuration, information, or field related to a feature (e.g., Release 17 feature) that the UE 1 does not support, the UE 1 may act to not ignore the values (or code points) in that configuration, information, or field.

For example, the UE 1 may recognize the size of a RACH resource set (or partition) for its desired feature or feature combination based on the value of the first ra-PreambleStartIndex field for the feature or feature combination it desires and the value of the second ra-PreambleStartIndex field for another feature or feature combination immediately following it. In this case, whether or not the UE 1 supports the feature or feature combination associated with the second ra-PreambleStartIndex field, it should not ignore the value of the second ra-PreambleStartIndex field.

In some of the above example embodiments, the UE 1 may perform a different operation (or process) for a particular feature or a feature combination including it than in the above example embodiments. For example, with respect to uplink carrier selection, the uplink carrier (e.g., NUL carrier) to be selected may be predetermined (or specified in the standard) for a particular feature (e.g., RedCap) or feature combination including it. This is useful to take full advantage of the feature's functionality or to account for any limitations in the feature's functionality.

In some of the above example embodiments, the UE 1 may perform a different operation (or process) for a particular feature or a feature combination including it than in the above example embodiments. For example, with respect to a particular feature (e.g., coverage enhancement), after uplink carrier selection, the UE 1 may decide whether or not the feature is needed (or whether or not to perform the feature). This is useful in cases where the functionality of the feature depends on the result of the uplink carrier selection.

The above-described example embodiments are merely examples of applications of the technical ideas obtained by the inventor. These technical ideas are not limited to the above-described example embodiments and various modifications can be made thereto.

For example, the whole or part of the example embodiments disclosed above can be described as, but not limited to, the following supplementary notes.

(Supplementary Note 1)

A radio terminal comprising:

at least one memory; and at least one processor coupled to the at least one memory and configured to:

perform a first random access using a random access resource associated with a feature combination; and if the first random access fails, fall back to a second random access using a random access resource associated with a feature subset included in the feature combination.

(Supplementary Note 2)

The radio terminal according to Supplementary Note 1, wherein the feature combination includes two or more of Reduced Capability (RedCap), Small Data Transmission (SDT), Coverage Enhancement (CovEnh), or Slicing, and the feature subset includes at least one of RedCap, SDT, CovEnh, or Slicing.

(Supplementary Note 3)

The radio terminal according to Supplementary Note 2, wherein the feature combination includes Reduced Capability (RedCap) and another feature, and the feature subset includes only RedCap.

(Supplementary Note 4)

The radio terminal according to Supplementary Note 2, wherein the feature combination includes Coverage Enhancement (CovEnh) and another feature, and the feature subset includes only CovEnh.

(Supplementary Note 5)

A method performed by a radio terminal, the method comprising:

performing a first random access using a random access resource associated with a feature combination; and if the first random access fails, falling back to a second random access using a random access resource associated with a feature subset included in the feature combination.

(Supplementary Note 6)

A program for causing a computer to perform a method for a radio terminal, the method comprising:

performing a first random access using a random access resource associated with a feature combination; and if the first random access fails, falling back to a second random access using a random access resource associated with a feature subset included in the feature combination.

(Supplementary Note 7)

A radio terminal comprising:

at least one memory; and at least one processor coupled to the at least one memory and configured to:

perform a contention-free random access (CFRA); and if the CFRA fails, fall back to a contention-based random access (CBRA) using a random access resource associated with a feature or a feature combination.

(Supplementary Note 8)

The radio terminal according to Supplementary Note 7, wherein the feature is Reduced Capability (RedCap), Small Data Transmission (SDT), Coverage Enhancement (CovEnh), or Slicing, and the feature combination includes at least two of RedCap, SDT, CovEnh, or Slicing.

(Supplementary Note 9)

The radio terminal according to Supplementary Note 7 or 8, wherein the CFRA is performed in a handover.

(Supplementary Note 10)

A method performed by a radio terminal, the method comprising:

performing a contention-free random access (CFRA); and if the CFRA fails, falling back to a contention-based random access (CBRA) using a random access resource associated with a feature or a feature combination.

(Supplementary Note 11)

A program for causing a computer to perform a method for a radio terminal, the method comprising:

performing a contention-free random access (CFRA); and if the CFRA fails, falling back to a contention-based random access (CBRA) using a random access resource associated with a feature or a feature combination.

(Supplementary Note 12)

A radio terminal comprising:

at least one memory; and at least one processor coupled to the at least one memory and configured to:

initiate a random access to initiate a Small Data Transmission (SDT); and if a need to transmit uplink data unrelated to the SDT arises while performing the SDT, perform a random access using a random access resource associated with a combination of one or more features excluding the SDT.

(Supplementary Note 13)

The radio terminal according to Supplementary Note 12, wherein the combination of one or more features includes at least one of Reduced Capability (RedCap), Coverage Enhancement (CovEnh), or Slicing.

(Supplementary Note 14)

A method performed by a radio terminal, the method comprising:

initiating a random access to initiate a Small Data Transmission (SDT); and if a need to transmit uplink data unrelated to the SDT arises while performing the SDT, performing a random access using a random access resource associated with a combination of one or more features excluding the SDT.

(Supplementary Note 15)

A program for causing a computer to perform a method for a radio terminal, the method comprising:

initiating a random access to initiate a Small Data Transmission (SDT); and if a need to transmit uplink data unrelated to the SDT arises while performing the SDT, performing a random access using a random access resource associated with a combination of one or more features excluding the SDT.

(Supplementary Note 16)

A radio terminal comprising:

at least one memory; and at least one processor coupled to the at least one memory and configured to:

perform a random access using a random access resource selected from a set of random access resources associated with a feature or a feature combination;

if the random access fails, include information about the feature or the feature combination in a random access report regarding a failure of the random access;

store the random access report; and transmit the random access report to a network, wherein the feature is Reduced Capability (RedCap), Small Data Transmission (SDT), Coverage Enhancement (CovEnh), or Slicing, and the feature combination includes at least two of RedCap, SDT, CovEnh, or Slicing.

(Supplementary Note 17)

The radio terminal according to Supplementary Note 16, wherein the at least one processor is configured to set a raPurpose field, included in the random access report and used to indicate a purpose of the random access, to indicate the information.

(Supplementary Note 18)

The radio terminal according to Supplementary Note 16, wherein the at least one processor is configured to set a new field included in the random access report to indicate the information.

(Supplementary Note 19)

The radio terminal according to any one of Supplementary Notes 16 to 18, wherein the at least one processor is configured to, if a first fallback from a preamble transmission using a random access resource associated with the feature combination to a preamble transmission using a random access resource associated with a feature subset included in the feature combination is performed in the random access, include information about the first fallback in the random access report.

(Supplementary Note 20)

The radio terminal according to any one of Supplementary Notes 16 to 19, wherein the at least one processor is configured to, if a second fallback from a preamble transmission using a random access resource associated with the feature or the feature combination to a preamble transmission using a random access resource not associated with the feature or the feature combination is performed in the random access, include information about the second fallback in the random access report.

(Supplementary Note 21)

A method performed by a radio terminal, the method comprising:

performing a random access using a random access resource selected from a set of random access resources associated with a feature or a feature combination;

if the random access fails, including information about the feature or the feature combination in a random access report regarding a failure of the random access;

storing the random access report; and transmitting the random access report to a network, wherein the feature is Reduced Capability (RedCap), Small Data Transmission (SDT), Coverage Enhancement (CovEnh), or Slicing, and the feature combination includes at least two of RedCap, SDT, CovEnh, or Slicing.

(Supplementary Note 22)

A program for causing a computer to perform a method for a radio terminal, the method comprising:

performing a random access using a random access resource selected from a set of random access resources associated with a feature or a feature combination;

if the random access fails, including information about the feature or the feature combination in a random access report regarding a failure of the random access;

storing the random access report; and transmitting the random access report to a network, wherein the feature is Reduced Capability (RedCap), Small Data Transmission (SDT), Coverage Enhancement (CovEnh), or Slicing, and the feature combination includes at least two of RedCap, SDT, CovEnh, or Slicing.

This application is based upon and claims the benefit of priority from Japanese Patent Application No. 2021-171922, filed on Oct. 20, 2021, the disclosure of which is incorporated herein in its entirety by reference.

REFERENCE SIGNS LIST

1 UE
2 RAN Node
21 Cell
903 Baseband Processor
904 Application Processor
906 Memory
907 Modules
1004 Processor
1005 Memory
1006 Modules

What is claimed is:

1. A radio terminal comprising:

at least one memory; and at least one processor coupled to the at least one memory and configured to:

perform a random access using a random access resource selected from a set of random access resources associated with a feature or a feature combination;

if a first fallback from a preamble transmission using a random access resource associated with the feature combination to a preamble transmission using a random access resource associated with a feature subset included in the feature combination is performed in the random access, include information about the first fallback in a random access report regarding the random access;

store the random access report; and transmit the random access report to a network, wherein the feature is associated with one of Device type with reduced or relaxed physical layer capability, Small data transmission in inactive state, Coverage enhancement, or Slicing, and the feature combination includes at least two of the Device type, the Small data transmission, the Coverage enhancement, or the SLicing.

2. The radio terminal according to claim 1, wherein the at least one processor is configured to set a raPurpose field, included in a random access report and used to indicate a purpose of the random access, to indicate the information.

3. The radio terminal according to claim 1, wherein the at least one processor is configured to set a new field included in the random access report to indicate the information.

4. The radio terminal according to claim 1, wherein the at least one processor is configured to, if a second fallback from a preamble transmission using a random access resource associated with the feature or the feature combination to a preamble transmission using a random access resource not associated with the feature or the feature combination is performed in the random access, include information about the second fallback in the random access report.

5. The radio terminal according to claim 1, wherein at the Device type with reduced or relaxed physical layer capability, the maximum device bandwidth, the minimum number of device receive branches, the maximum number of downlink Multiple Input Multiple Output (MIMO) layers, or the maximum downlink modulation order is reduced or relaxed compared to a device intended at least for Mobile Broadband (MBB).

6. The radio terminal according to claim 1, wherein the Device type with reduced or relaxed physical layer capability is for use of smart watches, wearable medical devices, Augmented Reality (AR)/Virtual Reality (VR) goggles, industrial wireless sensors, or video surveillance.

7. The radio terminal according to claim 1, wherein the Coverage enhancement is achieved by repetition of an uplink transmission or defined by more than one coverage enhancement levels.

8. A method performed by a radio terminal, the method comprising:

performing a random access using a random access resource selected from a set of random access resources associated with a feature or a feature combination;

if a first fallback from a preamble transmission using a random access resource associated with the feature combination to a preamble transmission using a random access resource associated with a feature subset included in the feature combination is performed in the random access, including information about the first fallback in a random access report regarding the random access;

storing the random access report; and transmitting the random access report to a network, wherein the feature is associated with one of Device type with reduced or relaxed physical layer capability, Small data transmission in inactive state, Coverage enhancement, or Slicing, and the feature combination includes at least two of the Device type, the Small data transmission, the Coverage enhancement, or the SLicing.

9. The method according to claim 8, further comprising setting a raPurpose field, included in a random access report and used to indicate a purpose of the random access, to indicate the information.

10. The method according to claim 8, further comprising setting a new field included in the random access report to indicate the information.

11. The method according to claim 8, further comprising, if a second fallback from a preamble transmission using a random access resource associated with the feature or the feature combination to a preamble transmission using a random access resource not associated with the feature or the feature combination is performed in the random access, including information about the second fallback in the random access report.

12. The method according to claim 8, wherein at the Device type with reduced or relaxed physical layer capability, the maximum device bandwidth, the minimum number of device receive branches, the maximum number of downlink Multiple Input Multiple Output (MIMO) layers, or the maximum downlink modulation order is reduced or relaxed compared to a device intended at least for Mobile Broadband (MBB).

13. The method according to claim 8, wherein the Device type with reduced or relaxed physical layer capability is for use of smart watches, wearable medical devices, Augmented Reality (AR)/Virtual Reality (VR) goggles, industrial wireless sensors, or video surveillance.

14. The method according to claim 8, wherein the Coverage enhancement is achieved by repetition of an uplink transmission or defined by more than one coverage enhancement levels.

15. A method performed by a radio access network node, the method comprising:

receiving a random access report from a radio terminal, wherein the random access report relates to a random access using a random access resource selected from a set of random access resources associated with a feature or a feature combination, the random access report contains information about a first fallback performed in the random access, wherein the first fallback is a fallback from a preamble transmission using a random access resource associated with the feature combination to a preamble transmission using a random access resource associated with a feature subset included in the feature combination, the feature is associated with one of Device type with reduced or relaxed physical layer capability, Small data transmission in inactive state, Coverage enhancement, or Slicing, and the feature combination includes at least two of the Device type, the Small data transmission, the Coverage enhancement, or the Slicing.

16. The method according to claim 15, wherein the random access report contains an raPurpose field for indicating a purpose of the random access, wherein the raPurpose field is set to indicate the information.

17. The method according to claim 15, wherein the random access report contains a new field set to indicate the information.

18. The method according to claim 15, wherein the random access report contains information about a second fallback performed in the random access, wherein the second fallback is a fallback from a preamble transmission using a random access resource associated with the feature or the feature combination to a preamble transmission using a random access resource not associated with the feature or the feature combination.

19. The method according to claim 15, wherein at the Device type with reduced or relaxed physical layer capability, the maximum device bandwidth, the minimum number of device receive branches, the maximum number of downlink Multiple Input Multiple Output (MIMO) layers, or the maximum downlink modulation order is reduced or relaxed compared to a device intended at least for Mobile Broadband (MBB).

20. The method according to claim 15, wherein the Device type with reduced or relaxed physical layer capability is for use of smart watches, wearable medical devices, Augmented Reality (AR)/Virtual Reality (VR) goggles, industrial wireless sensors, or video surveillance.

21. The method according to claim 15, wherein the Coverage enhancement is achieved by repetition of an uplink transmission or defined by more than one coverage enhancement levels.

* * * * *